Patented July 20, 1937

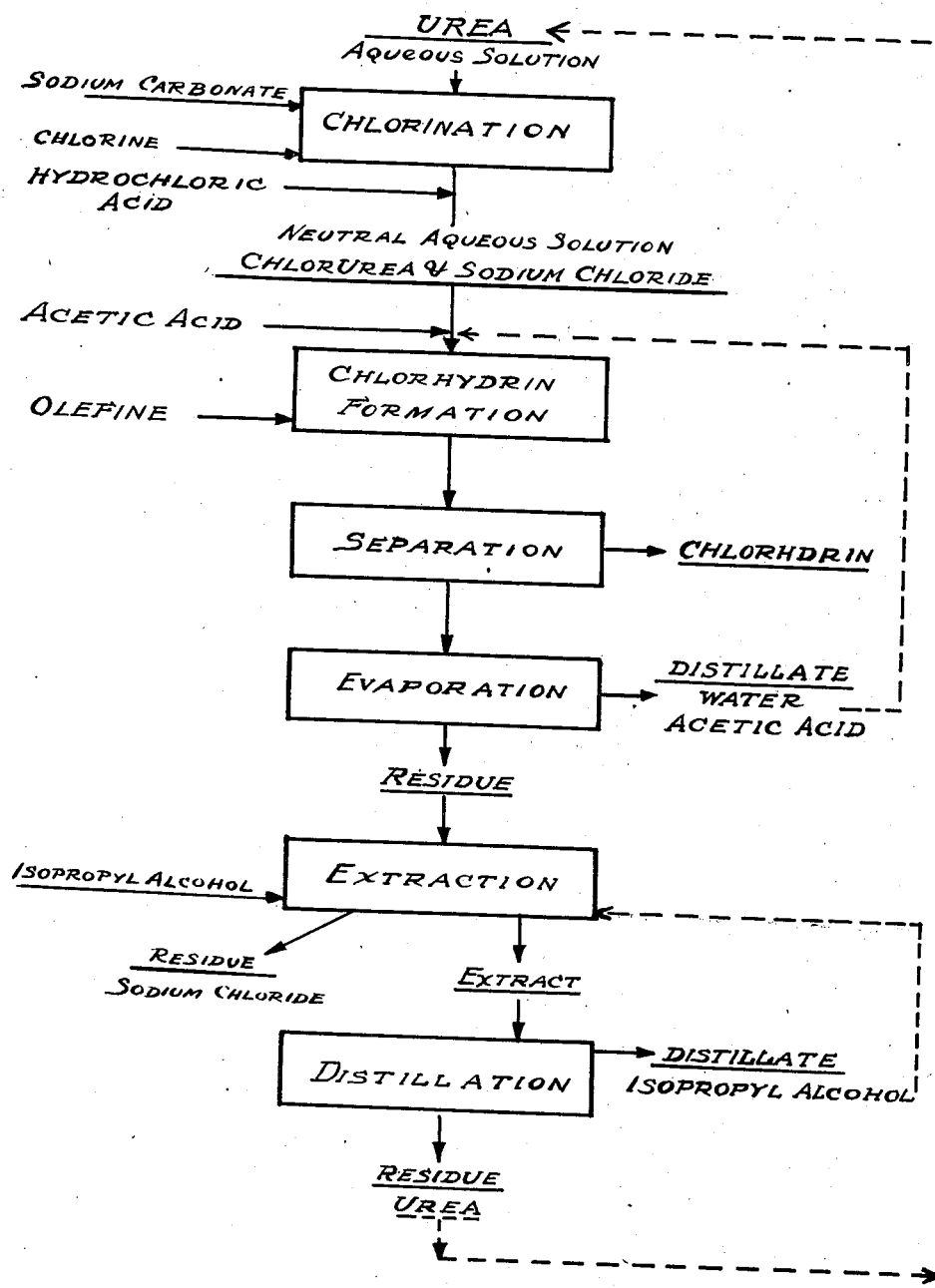

2,087,591

UNITED STATES PATENT OFFICE 2,087,591

CONTINUOUS PROCESS FOR THE PREPARATION OF CHLORHYDRIN AND THE RECOVERY OF UREA

Hyym E. Buc, Roselle, and Stewart C. Fulton, Elizabeth, N. J., assignors to Standard Oil Development Company, a corporation of Delaware Application December 30, 1933, Serial No. 704,676

22 Claims. (Cl. 260—125)

This invention relates to a method of separating urea from mixtures containing urea and alkali metal salts, especially as a means for recovering urea from mixtures resulting from the production of chlorhydrins in a process involving the chlorination of urea, hydrolysis of the resulting chlor-urea, and reacting the products of hydrolysis with suitable unsaturated organic compounds, thereby permitting the use of urea in a cyclic process.

Chlor-urea may be readily hydrolyzed to urea and hypochlorous acid and is, accordingly, suitable for the preparation of various derivatives of hypochlorous acid, such as the chlorhydrins which result from the reaction of hypochlorous acid with an olefine. Chlor-urea may be readily prepared by the chlorination of urea, suitably in concentrated aqueous solution. This reaction proceeds with the formation of equi-molal quantities of chlor-urea and urea hydrochloride; the latter being incapable of forming hypochlorous acid. The urea hydrochloride is readily converted to urea by reaction with a base capable of neutralizing hydrochloric acid. The presence of such a base, for example, sodium carbonate, during the chlorination of urea, accordingly makes possible the substantially complete conversion of urea to chlor-urea, after which the addition of a weak acid, such as acetic, readily permits controlled chlorhydrin formation with olefines. This method of producing chlor-urea, however, leaves large quantities of water soluble inorganic chlorides in the solution, and the separation of the urea, formed on hydrolysis of the chlor-urea to urea and hypochlorous acid, from such solution is one of the objects of this invention. Both urea and such inorganic chlorides possess very similar solubility characteristics, so that it is exceedingly difficult to separate these two components in an aqueous solution.

It has been discovered, however, that urea may be selectively dissolved from a substantially anhydrous mixture of urea and such inorganic chlorides by various organic solvents, of which the lower aliphatic alcohols having less than about 7 carbon atoms per molecule are preferred. Isopropyl alcohol in particular possesses the desirable property of dissolving very little of the inorganic chlorides and, at the same time, having a very high solvent capacity for urea. The lower alcohols dissolve somewhat more of the chlorides, while the higher alcohols, such as butyl, amyl, and hexyl, have progressively lower solvent capacity for urea and must be used in correspondingly larger quantities.

Urea decomposes readily on heating in the presence of many chlorides; for example, an aqueous solution of urea and calcium chloride cannot be evaporated to dryness under practical conditions without substantial decomposition of urea. Similar decomposition is observed with chlorides of other group II metals, such as magnesium chloride and the like, which also possess objectionably high solubility characteristics in organic solvents for urea, and render separation by this means less complete.

It has now been found that aqueous solutions of urea and alkali metal chlorides may be readily evaporated to dryness without appreciable decomposition of the urea, thereby permitting a continuous cyclic process with substantially no loss of urea in which an alkali metal base, preferably of sodium or potassium, is used in the preparation of chlor-urea, and after the liberation of hypochlorous acid, the remaining aqueous solution of urea and the alkali metal chloride is evaporated to dryness, the urea is selectively extracted from the dried residue with a suitable solvent, such as isopropyl alcohol, and is returned to the chlorination step.

This invention also applies to the recovery of urea from other salts of urea, such as the addition products of urea with other hydrohalides and with acids generally, particularly strong mineral acids, in the same manner as described herein for its recovery from urea hydrochloride.

The drawing represents a diagrammatic flow plan for conducting such a process, and will be described in connection with the following illustrative example:

An aqueous solution of 120 grams of urea and 60 cc. of water is chlorinated at 32° F. by the slow addition of chlorine. Dry powdered sodium carbonate is added slowly during the chlorination in sufficient amounts to maintain a slightly alkaline solution. The chlorination is conducted to substantial completion as indicated by an increase in weight corresponding to about one equivalent of chlor-urea. The reaction mixture is then diluted to 515 cc. with water.

100 cc. of this diluted reaction mixture is mixed with 200 cc. of water, 30 cc. of glacial acetic acid, and 350 grams of a cracked paraffin wax distillate of 375 to 600° F. boiling range, containing approximately 30% olefines of about 180 average molecular weight, and obtained by the destructive distillation of paraffin wax at atmospheric pressure. This mixture is agitated for about four hours and is then allowed to stand. An upper layer thereupon forms and is separately withdrawn. This layer contains 11.7% chlorhydrins in admixture with paraffins and unreacted olefines from the cracked wax distillate. The chlorhydrins may be used for various purposes, for example, they may be treated with sulphuric acid and the acid derivatives neutralized to prepare improved chlorsulfo detergent soaps as described in the co-pending application, Serial No. 689,564, filed September 15, 1933, by Hyym E. Buc. The chlorhydrins may also be hydrolyzed to the glycols with aqueous caustic soda, sulfated, and the sulfuric acid derivatives neutralized to form disulfate or hydroxy sulfate detergent soaps as described in the co-pending application, Serial No. 704,756 filed December 30, 1933, by Stewart C. Fulton.

The lower aqueous layer obtained from the above separation step is withdrawn to a urea recovery system in which it is evaporated under vacuum at a maximum temperature of about 80 to 95° C. to remove water and acetic acid. The dry residue is then extracted with hot methyl alcohol at about 50° C. The alcohol is then distilled from this extract leaving 28 grams of a residue containing 96% of the original urea. This residue may be returned to the initial chlorination step in a cyclic process in which no increase in the salt content of the recovered urea is observed.

The rate of reaction in the preparation of chlorhydrins from olefines in the above example may be increased and the yield of chlorhydrins based on the olefines used may also be increased by the use of more active hydrolyzing agents than acetic acid; for example, substituted acetic acid such as chloracetic acid or dichloracetic acid (preferably for highly unreactive olefines) or urea hydrochloride may be used as the hydrolyzing agent in this reaction. These agents may also be subsequently recovered from the aqueous layer and recycled. For example, if urea hydrochloride is present during this step it may be subsequently converted to urea by neutralization with sodium carbonate prior to the evaporation and extraction steps.

This process is especially applicable to the production of chlorhydrins of olefines which serve as valuable intermediates. For example, ethylene, propylene and similar olefines may be converted to chlorhydrins by the herein described process and may subsequently be hydrolyzed to the corresponding glycols which possess valuable commercial properties in the solvent and antifreeze and chemical preparations fields. Higher molecular weight olefines, containing preferably more than 6 or 8 carbon atoms and up to 12, 18, 20, 30 or even higher and preferably having an olefinic linkage at or near the end of the carbon chain, may be converted to chlorhydrins as a step in the preparation of improved detergents and wetting agents. Such olefines may be obtained by the dehydration of fatty alcohols, such as lauryl, cetyl and octadecyl alcohols, and by the reduction and/or dehydration of fatty acids, alcohols and other high molecular weight oxy organic compounds, such as those obtained by the limited oxidation of petrolatum or paraffin wax. Particularly desirable olefines for the preparation of improved detergents, because of their substantial freedom from oxygen and carboxyl groups, are those obtained by cracking high molecular weight paraffinic hydrocarbons. For example, paraffin wax or petrolatum may be cracked under conditions avoiding substantial polymerization to produce mixtures of olefines which are directly suitable for the herein described process. Such cracking operations may be conducted in liquid or vapor phase; for example, at about 650 to 750° F. in liquid phase, or at 1000 to 1100° F. in vapor phase, with a very short cracking time and a quick cooling of the cracked products to avoid polymerization and secondary reactions insofar as possible. The cracking operation may be conducted at atmospheric pressure or at pressures either above or below atmospheric, the latter being of especial advantage in avoiding the formation of polymerization products.

This invention is not to be limited to any theoretical explanations or specific examples which have been presented herein solely for purposes of illustration, but is to be limited only by the following claims in which it is desired to claim all novelty insofar as the prior art permits.

We claim:

1. Method for recovery of urea from a salt of urea comprising adding to said salt a basic compound of an alkali metal, evaporating to dryness without substantial decomposition of urea and separating of urea from the mineral salts in the dried residue with a selective solvent for urea.

2. Method for recovery of urea from an aqueous solution containing a salt of urea comprising treating said solution with a basic compound of an alkali metal, evaporating to dryness without substantial decomposition of urea and separating of urea from the mineral salts in the dried residue with a selective solvent for urea.

3. Method, according to claim 2, in which said salt of urea is a urea hydrohalide.

4. Method, according to claim 2, in which said salt of urea is urea hydrochloride.

5. Method, according to claim 2, in which the said basic compound is sodium carbonate.

6. Method, according to claim 2, in which the said selective solvent is an aliphatic alcohol of less than about 7 carbon atoms.

7. Method, according to claim 2, in which the said selective solvent is a propyl alcohol.

8. In a process for the preparation of hypochlorous acid and chlorhydrins involving the chlorination of urea to chlor-urea and hydrolysis of the chlor-urea to urea and hypochlorous acid, a method for recovery of substantially pure urea comprising conducting said chlorination of urea in the presence of an alkali metal base, hydrolyzing the resulting chlor-urea to form urea and hypochlorous acid, adding a material capable of reacting with hypochlorous acid to form chlorhydrins, removing the resultant chlorhydrins, evaporating the remaining aqueous solution of urea and the mineral salts to dryness without substantial decomposition of urea, and separating the urea from the mineral salts in the dried residue with a selective solvent for urea.

9. Method according to claim 8 in which the material added to react with hypochlorous acid to form chlorhydrins is an olefine.

10. Method, according to claim 8, in which said hydrolysis of the chlor-urea is promoted by the addition of a volatile hydrolyzing agent which is removable during said evaporation to dryness.

11. Method, according to claim 8, in which said hydrolysis of chlor-urea is promoted by the addition of acetic acid.

12. Process for producing chlorhydrins involving the use of urea in a cyclic process, comprising chlorinating urea in aqueous solution in the presence of sodium carbonate, hydrolyzing the resulting chlor-urea in the presence of an olefine, removing the resulting chlorhydrin, evaporating the remaining aqueous solution containing urea and sodium salts to dryness, separating the urea from the dried residue by extraction with isopropyl alcohol and returning the urea to the said chlorination step.

13. Process, according to claim 12, in which the said olefine is a mixture of olefines derived from cracked hydrocarbons.

14. Process, according to claim 12, in which the said olefine comprises a mixture of olefines derived from cracked paraffin hydrocarbons.

15. Process, according to claim 12, in which the said olefine comprises a mixture of olefines derived from cracked petroleum paraffinic hydrocarbons not lighter than petrolatum.

16. Process, according to claim 12, in which the said olefine comprises a mixture of olefines obtained by cracking a petroleum paraffinic hydrocarbon fraction not lighter than petrolatum under conditions at which no substantial polymerization occurs.

17. Method of recovering urea from mixtures of urea with alkali metal salts, which comprises extracting said mixtures with a selective solvent for urea, separating the solution from the residue and evaporating off the solvent to leave urea.

18. Method according to claim 17, in which the mixtures treated are derived by evaporating to dryness an aqueous solution of urea and alkali metal salt.

19. Method of recovering urea from mixtures thereof with alkali metal halides, which comprises extracting the urea from said mixtures with a lower aliphatic alcohol, separating the solution from the salt residue and evaporating off the alcohol to leave urea.

20. Process according to claim 19 in which the alcohol used is methyl alcohol.

21. The process which comprises halogenating urea in the presence of an alkali metal base.

22. Process for producing halo-hydrins which comprises halogenating urea in aqueous solution in the presence of an alkali metal base, hydrolyzing the resulting halogen-urea, treating the products of hydrolysis with an olefine, removing the resulting halo-hydrins, evaporating the remaining aqueous solution containing the urea and alkali metal salts to dryness, separating the urea from the dried residue by extraction with a selective solvent for urea and returning the urea to the halogenation step.

HYYM E. BUC.
STEWART C. FULTON.